United States Patent
Carter et al.

(10) Patent No.: US 9,477,648 B1
(45) Date of Patent: Oct. 25, 2016

(54) OPTIMIZED WEB APPLICATION USER EXPERIENCE

(71) Applicants: Robert Neil Carter, Tucson, AZ (US); Brendan Philip Quarterman Jennings, Sahuarita, AZ (US)

(72) Inventors: Robert Neil Carter, Tucson, AZ (US); Brendan Philip Quarterman Jennings, Sahuarita, AZ (US)

(73) Assignee: Intuit Inc., Mountain View, CA (US)

( * ) Notice: Subject to any disclaimer, the term of this patent is extended or adjusted under 35 U.S.C. 154(b) by 262 days.

(21) Appl. No.: 14/194,536

(22) Filed: Feb. 28, 2014

(51) Int. Cl.
*G06F 17/00* (2006.01)
*G06F 17/22* (2006.01)

(52) U.S. Cl.
CPC ................................ *G06F 17/2247* (2013.01)

(58) Field of Classification Search
CPC ......................... G06F 17/3089; G06F 17/2247
See application file for complete search history.

(56) References Cited

U.S. PATENT DOCUMENTS

| | | | | |
|---|---|---|---|---|
| 6,477,483 B1* | 11/2002 | Scarlat | ................. | G06F 11/3414 702/186 |
| 8,296,643 B1* | 10/2012 | Vasilik | ................. | G06F 17/3089 715/200 |
| 2005/0071745 A1* | 3/2005 | Ehrich | ..................... | H04L 67/02 715/200 |
| 2008/0163064 A1* | 7/2008 | Swildens | ............ | H04L 67/1008 715/736 |
| 2009/0030859 A1* | 1/2009 | Buchs | ................ | G06F 17/30899 706/19 |
| 2010/0064281 A1* | 3/2010 | Kimball | .............. | H04L 41/0853 717/124 |
| 2010/0268764 A1* | 10/2010 | Wee | ......................... | G06F 9/505 709/203 |
| 2011/0161825 A1* | 6/2011 | Tierney | ............... | G06F 11/3672 715/736 |
| 2015/0095756 A1* | 4/2015 | Aganovic | ........... | G06F 17/2247 715/234 |
| 2015/0227962 A1* | 8/2015 | Wical | .................. | G06Q 30/0243 705/14.42 |
| 2015/0278962 A1* | 10/2015 | Agarwal | ............ | G06Q 30/0244 705/7.39 |
| 2016/0147632 A1* | 5/2016 | Vazac | .................. | G06F 11/3495 702/122 |

OTHER PUBLICATIONS

Inverse-variance weighting from Wikipedia, last modified on Feb. 6, 2014, accessed from https://en.wikipedia.org/wiki/Inverse-variance_weighting.*

* cited by examiner

*Primary Examiner* — Scott Baderman
*Assistant Examiner* — Barbara Level
(74) *Attorney, Agent, or Firm* — Osha Liang LLP

(57) ABSTRACT

A method, system, and computer readable medium to iteratively determine and deliver optimal experience of a web application running on multiple servers for the Internet. For example the multiple servers may be behind a single virtual Internet Protocol (IP) Address in a server farm. A candidate of the optimal webpage configuration is separately determined by each server of the server farm independent of each other. At recurring synchronization time points, the outcome of interest statistics from multiple servers are aggregated and used by each server to continue the next iteration until the convergence condition is detected.

24 Claims, 9 Drawing Sheets

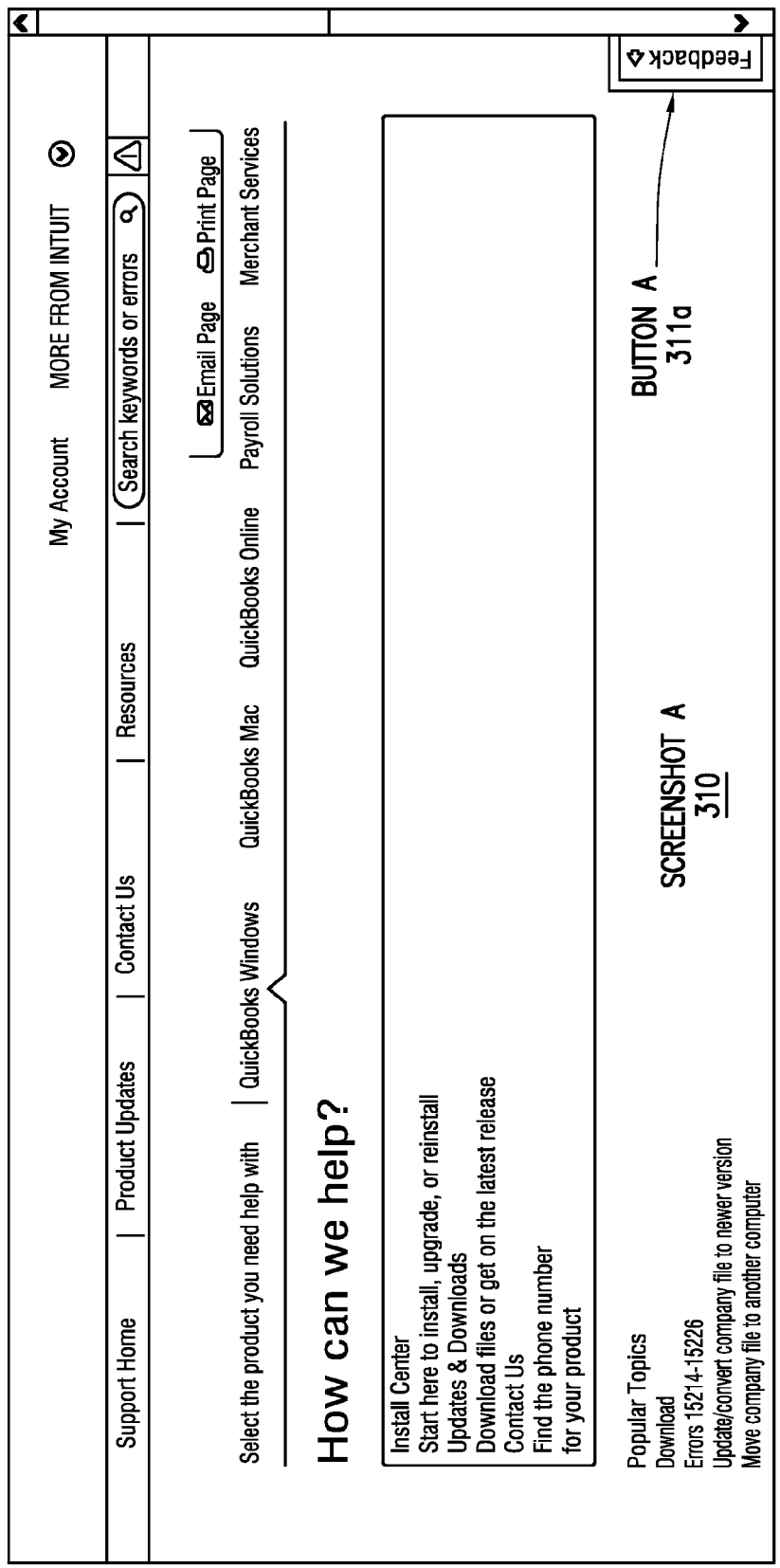
FIG. 3.1

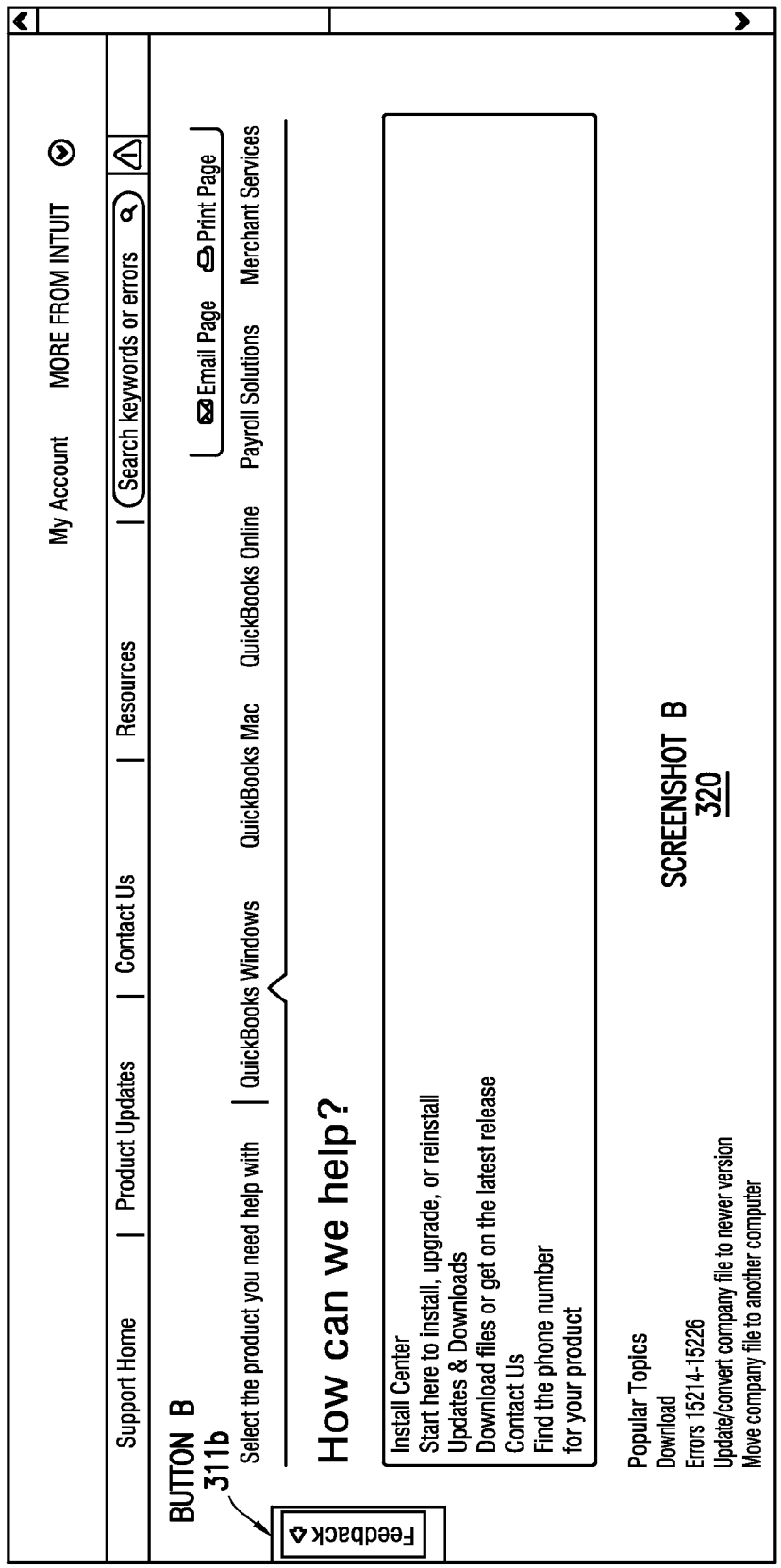
FIG. 3.2

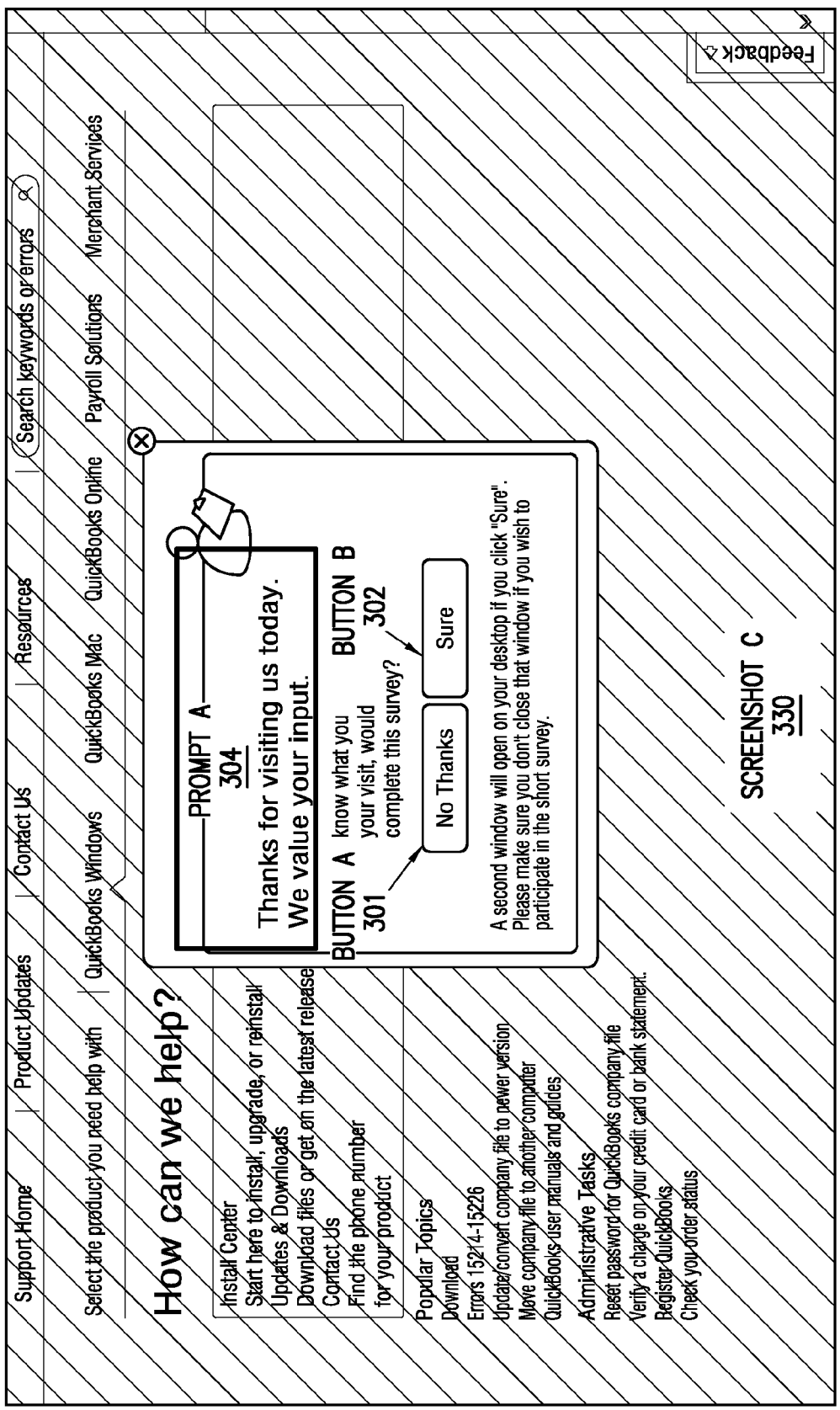
FIG. 3.3

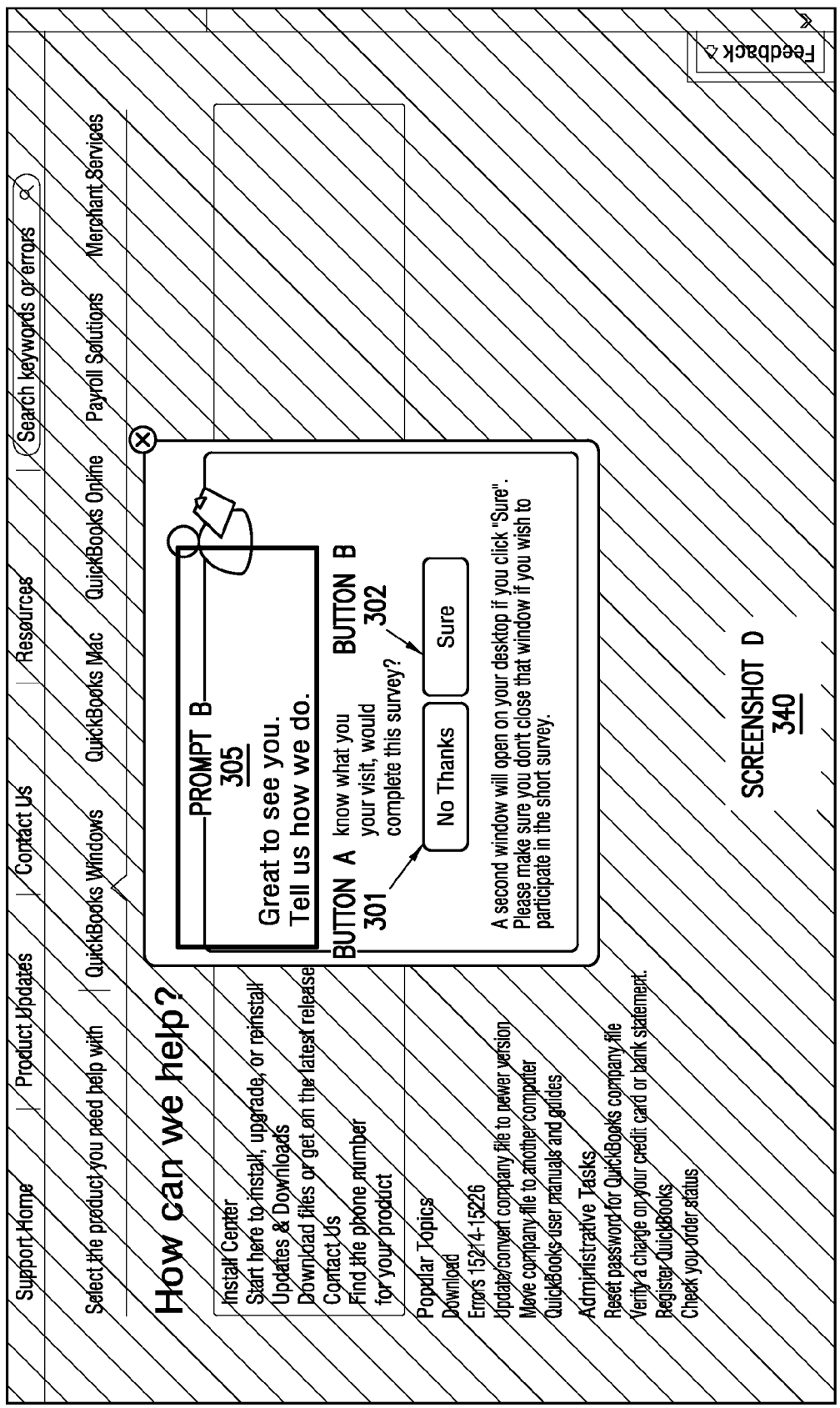
FIG. 3.4

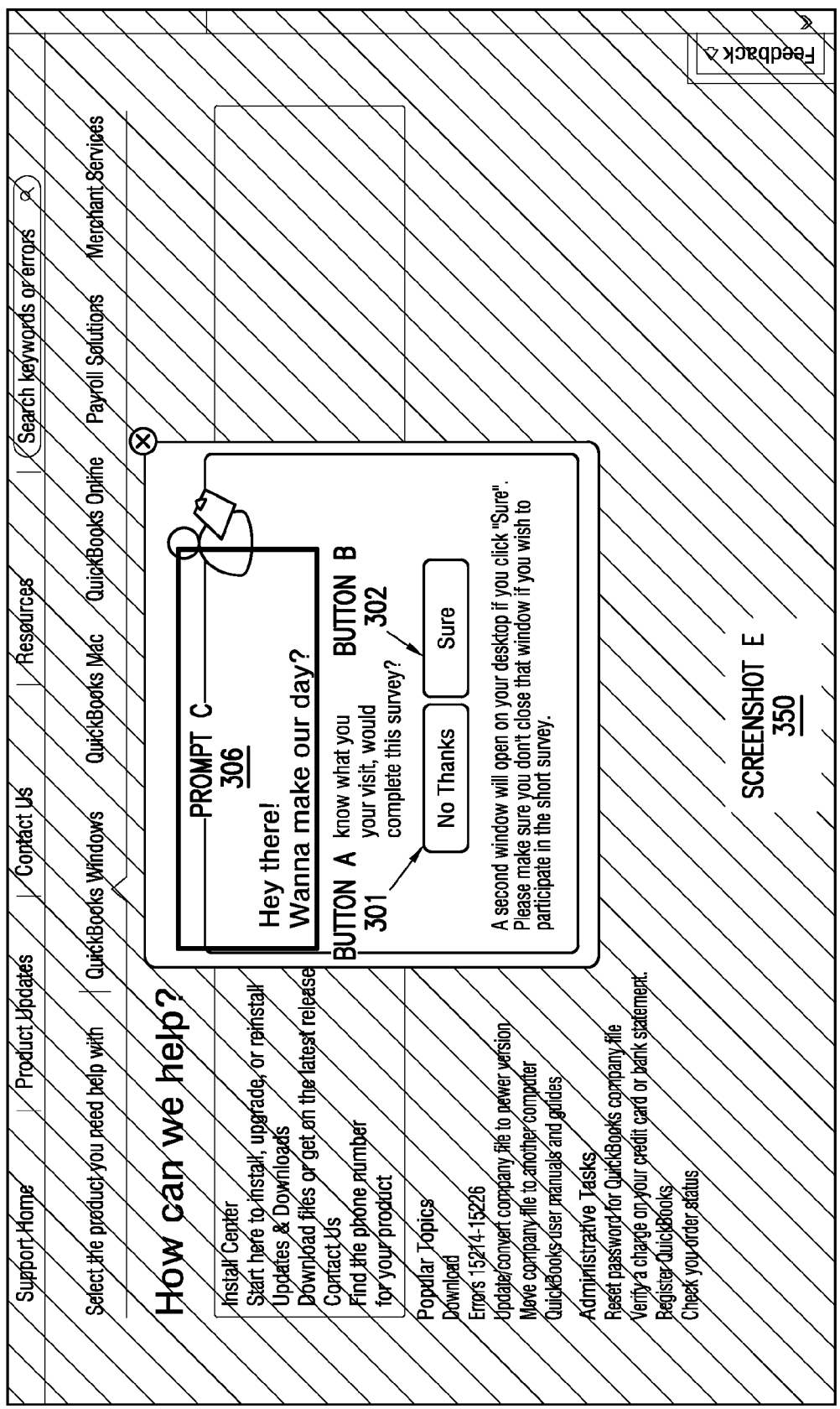
FIG. 3.5

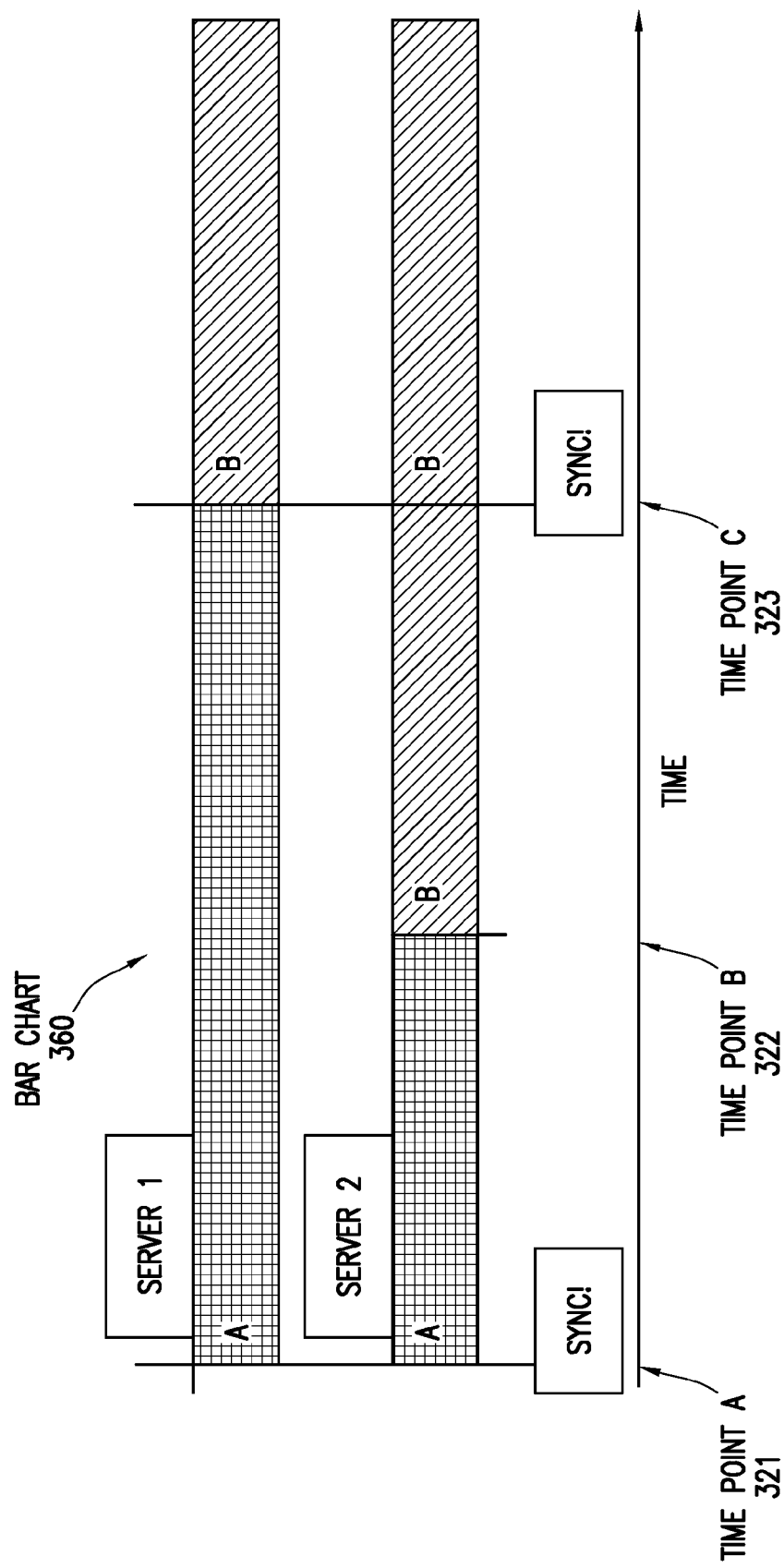

OPTIMIZED WEB APPLICATION USER EXPERIENCE

BACKGROUND

A/B testing is a term commonly used in web development, online marketing, and other forms of advertising to describe simple randomized experiments with two variants, namely A and B, which are the control and treatment in the controlled experiment. A/B testing may also be referred to as randomized controlled experiments, online controlled experiments, and split testing. In web design (especially user experience design), the goal is to identify changes to webpages that increase or maximize an outcome of interest (e.g., click-through rate for a banner advertisement). As the name implies, two versions (A and B) of webpage configurations are compared, which are identical except for one variation that may impact a user's behavior. Version A may be the currently used version (referred to as control), while Version B is modified in some respect (referred to as treatment). For instance, on an e-commerce website the purchase funnel is typically a good candidate for A/B testing, as even marginal improvements in drop-off rates can represent a significant gain in sales. Significant improvements can sometimes be seen through variation in text, layout, image, colors, or other aspects of the webpage configuration. The multivariate or multinomial testing is similar to A/B testing, but may test more than two different versions at the same time and/or has more controls, etc.

SUMMARY

In general, in one aspect, the invention relates to a method to select an optimal webpage configuration for a server farm. The method includes determining, by a first server of the server farm and in response to a recurring trigger event, a first measure of user response of a first user group to a plurality of webpage configurations as presented by the first server to the first user group, determining a current selection of the plurality of webpage configurations, wherein the current selection is a first candidate of the optimal webpage configuration prior to the pre-determined trigger event, determining, by the first server and in response to determining the first measure of user response, an updated selection from the plurality of webpage configurations, wherein the updated selection is determined based on the first measure of user response, and wherein the updated selection is determined as a target to replace the current selection as the first candidate of the optimal webpage configuration, obtaining, by the first server and in response to targeting the updated selection to replace the current selection, a second measure of user response, a first burden rate of the first server and a second burden rate of the second server, wherein the second measure of user response is determined by a second server of the server farm, wherein the second measure of user response represents a response of a second user group to the plurality of webpage configurations as presented by the second server to the second user group, wherein the first burden rate represents first relative contribution of the first server to a total workload performed by the server farm, and wherein the second burden rate represents second relative contribution of the second server to the total workload performed by the server farm, aggregating, by the first server, the first measure of user response and at least the second measure of user response to generate an aggregate user response measure, wherein the first measure of user response and the second measure of user response are inversely weighted by the first burden rate and the second burden rate, respectively, in the aggregate user response measure, and selecting, by the first server and based on the aggregate user response measure, one of the current selection and the updated selection as the first candidate of the optimal webpage configuration subsequent to the pre-determined trigger event.

In general, in one aspect, the invention relates to a system for selecting an optimal webpage configuration for a server farm. The system includes a first server of the server farm configured to determine, in response to a recurring trigger event, a first measure of user response of a first user group to a plurality of webpage configurations as presented by the first server to the first user group, and a second server configured to determine a second measure of user response, wherein the first server is further configured to determine a current selection of the plurality of webpage configurations, wherein the current selection is a first candidate of the optimal webpage configuration prior to the pre-determined trigger event, determine, in response to determining the first measure of user response, an updated selection from the plurality of webpage configurations, wherein the updated selection is determined based on the first measure of user response, and wherein the updated selection is determined as a target to replace the current selection as the first candidate of the optimal webpage configuration, obtain, in response to targeting the updated selection to replace the current selection, the second measure of user response, a first burden rate of the first server and a second burden rate of the second server, wherein the second measure of user response is determined by a second server of the server farm, wherein the second measure of user response represents a response of a second user group to the plurality of webpage configurations as presented by the second server to the second user group, wherein the first burden rate represents first relative contribution of the first server to a total workload performed by the server farm, and wherein the second burden rate represents second relative contribution of the second server to the total workload performed by the server farm, aggregate the first measure of user response and at least the second measure of user response to generate an aggregate user response measure, wherein the first measure of user response and the second measure of user response are inversely weighted by the first burden rate and the second burden rate, respectively, in the aggregate user response measure, and select, based on the aggregate user response measure, one of the current selection and the updated selection as the first candidate of the optimal webpage configuration subsequent to the pre-determined trigger event.

In general, in one aspect, the invention relates to a non-transitory computer readable medium storing instructions to select an optimal webpage configuration for a server farm. The instructions, when executed by a computer processor, comprising functionality for determining, by a first server of the server farm and in response to a recurring trigger event, a first measure of user response of a first user group to a plurality of webpage configurations as presented by the first server to the first user group, determining a current selection of the plurality of webpage configurations, wherein the current selection is a first candidate of the optimal webpage configuration prior to the pre-determined trigger event, determining, by the first server and in response to determining the first measure of user response, an updated selection from the plurality of webpage configurations, wherein the updated selection is determined based on the first measure of user response, and wherein the updated selection is determined as a target to replace the current selection as the first candidate of the optimal webpage configuration, obtaining, by the first server and in response to targeting the updated selection to replace the current selection, a second measure of user response, a first burden rate of the first server and a second burden rate of the second server, wherein the second measure of user response is determined by a second server of the server farm, wherein the second measure of user response represents a response of a second user group to the plurality of webpage configurations as presented by the second server to the second user group, wherein the first burden rate represents first relative contribution of the first server to a total workload performed by the server farm, and wherein the second burden rate represents second relative contribution of the second server to the total workload performed by the server farm, aggregating, by the first server, the first measure of user response and at least the second measure of user response to generate an aggregate user response measure, wherein the first measure of user response and the second measure of user response are inversely weighted by the first burden rate and the second burden rate, respectively, in the aggregate user response measure, and selecting, by the first server and based on the aggregate user response measure, one of the current selection and the updated selection as the first candidate of the optimal webpage configuration subsequent to the pre-determined trigger event.

Other aspects of the invention will be apparent from the following description and the appended claims.

BRIEF DESCRIPTION OF DRAWINGS

FIGS. 3.1, 3.2. 3.3, 3.4, 3.5, and 3.6 show an example in accordance with one or more embodiments of the invention.

DETAILED DESCRIPTION

Figure 1:
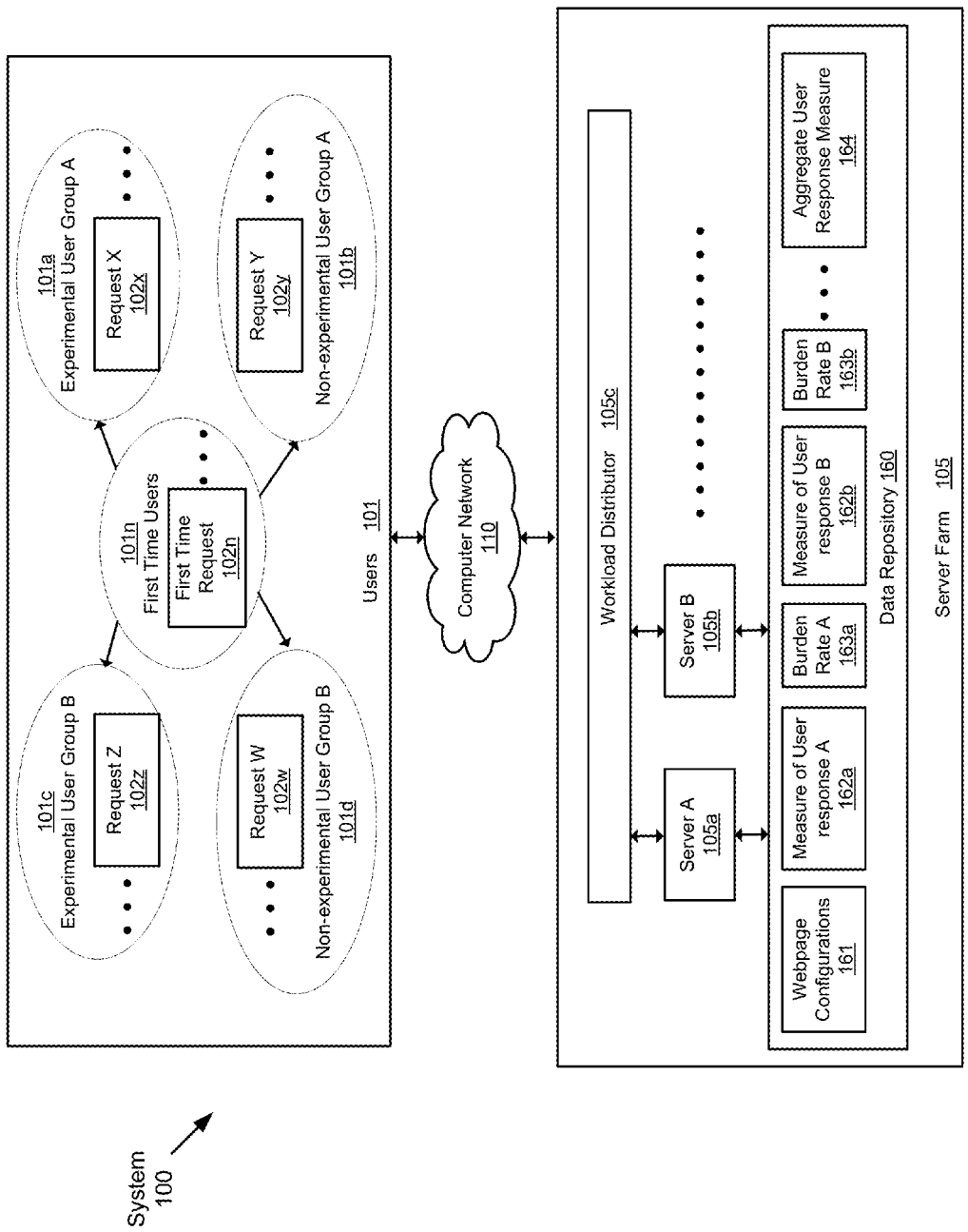
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, system, and computer readable medium to iteratively determine and deliver optimal experience of a web application running on multiple servers for the Internet. For example the multiple servers may be behind a single virtual Internet Protocol (IP) Address in a server farm. In one or more embodiments, the server farm is a collection of computer servers usually maintained by an enterprise to accomplish server functionality beyond the capability of a single machine In one or more embodiments, the server farm is used to host one or more websites, such as an e-commerce site.

In using A/B testing to determine an optimal webpage configuration, half of the time the users are presented the sub-optimal webpage configuration (i.e., treatment in the controlled experiment). In one or more embodiments, two or more alternative webpage configurations are randomly presented to the users in ten percent of time. The other ninety percent of the time, a selected webpage configuration that has produced highest level of outcome of interest is presented to the users. Each time any webpage configuration is presented to a user, the outcome of interest statistics is accumulated automatically such that the selected webpage configuration is iteratively updated. Accordingly, a convergence condition is detected automatically without human intervention to select the optimal webpage configuration when the iterations no longer result in any change in the selected webpage configuration. During the iterations prior to the convergence condition, the selected webpage configuration is referred to as a candidate of the optimal webpage configuration, or simply referred to as the candidate. In other words, the candidate is iteratively updated to converge to the optimal webpage configuration.

In one or more embodiments, the candidate of the optimal webpage configuration is separately determined by each server of the server farm independent of each other. At recurring synchronization time points, the outcome of interest statistics from multiple servers are aggregated and used by each server to continue the next iteration until the convergence condition is detected.

FIG. 1 shows a block diagram of a system (100) in accordance with one or more embodiments of the invention. Specifically, the system (100) includes users (101) and a server farm (105) that are communicatively coupled via a computer network (110). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the computer network (110) may include a cellular phone network, a wide area network, a local area network, a public switched telephone network (PSTN), or any other suitable network that facilitates the exchange of information from one part of the network to another. In one or more embodiments, the computer network (110) is communicatively coupled to or overlaps with the Internet.

In one or more embodiments, the server farm (105) includes a workload distributor (105c), multiple servers (e.g., server A (105a), server B (105b)), and a data repository (160). Although shown as part of the server farm (105), the data repository (160), or a portion thereof may be separate from the server farm (105). In one or more embodiments, the repository (160) may include a disk drive storage device, a semiconductor storage device, a database management system, other suitable computer data storage device, or combinations thereof. In one or more embodiments, content stored in the repository (160) may be a data file, a linked list, a data sequence, a database, a graphical representation, or any other suitable data structure.

In one or more embodiments, the server farm (105) hosts one or more websites (not shown) that are accessed by the users (101). In one or more embodiments, each user among the users (101) may include any computing device configured with computing, data storage, and network communication functionalities for accessing a webpage of the one or more websites hosted by the server farm (105). For example, the computing device may be used to request a webpage from the server farm (105) and to display the webpage returned by the server farm (105). The activities of the server farm (105) to process webpage requests from the users (101) and to return the requested webpage are referred to as the workload of the server farm (105).

In one or more embodiments, the server farm (105) includes the workload distributor (105c) that is configured to distribute the workload of the server farm (105) to the servers, such as the server A (105a), server B (105b), etc. Accordingly, a request (e.g., request X (102x), request Y (102y), request Z (102z), request W (102w), first time request (102n)) from one of the users (101) to access the webpage (not shown) is distributed to one of the server A (105a), server B (105b), etc. The particular server receiving the request from the workload distributor (105c) processes the request and returns the requested webpage to the requesting user. In one or more embodiments, the requested webpage corresponds to multiple versions available from the server farm (105). In particular, each version includes a variation in an aspect of the webpage configuration, such as text, image, layout, etc. Specifically, the multiple versions of the requested webpage are based on the webpage configurations (161) stored in the data repository (160). In other words, the returned webpage is based on one of the webpage configurations (161) that is selected by the particular server processing the request.

In one or more embodiments, the relative contribution of each server to the total amount of workload performed by the server farm (105) is referred to as the burden rate of the server. The burden rate may be estimated by the workload distributor (105c) or determined based on workload processing statistics obtained from each server of the server farm (105). For example, the relative contribution of the server A (105a) to the total workload is determined and stored in the data repository (160) as the burden rate A (163a). Similarly, the relative contribution of the server B (105b) to the total workload is determined and stored in the data repository (160) as the burden rate B (163b). Examples of determining the burden rate are described in reference to FIG. 3.6 below.

From time to time, the users (101) expand to include additional users who request the webpage for the very first time. These additional users are referred to as the first time users (101n). In one or more embodiments, the first time requests from a portion of the first time users (101n) are routed to the server A (105a) where each returned webpage is selected randomly from the webpage configurations (161). A user whose first time request (e.g., first time request (102n)) is processed by the server A (105a) to return a randomly selected webpage configuration is removed from the first time users (101n) into the experimental user group A (101a).

For example, the request X (102x) is a recurring request from this user subsequent to moving into the experimental user group A (101a). Similarly, another user whose first time request (e.g., first time request (102n)) is processed by the server B (105b) to return a randomly selected webpage configuration is removed from the first time users (101n) into the experimental user group B (101c). For example, the request Z (102z) is another recurring request from another user subsequent to moving to the experimental user group B (101c). In one or more embodiments, the server A (105a) is configured to return a randomly selected webpage configuration to 10% of the first time requests processed by the server A (105a). Similarly, the server B (105b) is configured to return a randomly selected webpage configuration to 10% of the first time requests processed by the server B (105b).

Accordingly, approximately 10% of user population (e.g., the experimental user group A (101a), the experimental user group B (101c)) received a randomly selected webpage configuration.

In one or more embodiments, the first time requests from another portion of the first time users (101n) are routed to the server A (105a) where each returned webpage is selected from the webpage configurations (161) based on a pre-determined measure of user response received by each of the webpage configurations (161). For example, the pre-determined measure of user response may be a click-through rate or other outcome of interest that is accumulated statistically, up to the time of the request, for each of the webpage configurations (161). The webpage configuration that has the highest measure of user response (e.g., highest outcome of interest statistics) among all of the webpage configurations (161) is referred to as a candidate of the optimal webpage configuration. In one or more embodiments, the candidate of the optimal webpage configuration is selected as the returned webpage.

A user whose first time request (e.g., first time request (102n)) is processed by the server A (105a) to return the candidate of the optimal webpage configuration is removed from the first time users (101n) into the non-experimental user group A (101b). For example, the request Y (102y) is a recurring request from this user subsequent to moving to the non-experimental user group A (101b). Similarly, another user whose first time request (e.g., first time request (102n)) is processed by the server B (105b) to return the candidate of the optimal webpage configuration is removed from the first time users (101n) into the non-experimental user group B (101d). For example, the request W (102w) is another recurring request from another user subsequent to moving to the non-experimental user group B (101d). In one or more embodiments, the server A (105a) is configured to return the candidate of the optimal webpage configuration to 90% of the first time requests processed by the server A (105a). Similarly, the server B (105b) is configured to return the candidate of the optimal webpage configuration to 90% of the first time requests processed by the server B (105b). Accordingly, approximately 90% of user population (e.g., the non-experimental user group A (101b), non-experimental user group B (101d)) received a randomly selected webpage configuration.

In one or more embodiments, the webpage configuration returned in response to the first time request (102n) is assigned to the requesting user when the requesting user is moved to one of the experimental user group A (101a), non-experimental user group A (101b), experimental user group B (101c), and non-experimental user group B (101d). Accordingly, for all subsequent recurring requests of the webpage, the user receives the same webpage configuration consistently based on the first time returned webpage.

The measure of user response associated with the portion of workload distributed to the server A (105a) is referred to as the measure of user response A (162a). In one or more embodiments, the measure of user response A (162a) is determined by the server A (105a) independent of any other server in the server farm (105). In particular, the measure of user response A (162a) includes a measure determined by the server A (105a) for each of the webpage configurations (161). Similarly, the measure of user response associated with another portion of workload distributed to the server B (105b) is referred to as the measure of user response B (162b).

In one or more embodiments, the measure of user response B (162b) is determined by the server B (105b)

independent of any other server in the server farm (105). In particular, the measure of user response B (162*b*) includes a measure determined by the server B (105*b*) for each of the webpage configurations (161). Accordingly, the candidate of the optimal webpage configuration selected by the server A (105*a*) may be different than the candidate of the optimal webpage configuration selected by the server B (105*b*). In one or more embodiments, the respective candidate of the optimal webpage configuration is updated periodically as additional user responses are accumulated over time by the server A (105*a*) and server B (105*b*). In one or more embodiments, a convergence condition is detected over time when the candidates selected by all servers in the server farm (105) converge to the same webpage configuration, which is referred to as the optimal webpage configuration.

In one or more embodiments, the server A (105*a*) updates the measure of user response A (162*a*) in response to a recurring trigger event. In other words, the measure of user response A (162*a*) is re-computed each time the recurring trigger event is detected. For example, the recurring trigger event may be based on a pre-determined time interval, such as hourly, daily, etc. In another example, the recurring trigger event may be based on webpage requests from the users (101). In yet another example, the recurring trigger event may be based on a combination of pre-determined time intervals and the webpage requests. Similarly, the server B (105*b*) updates the measure of user response B (162*b*) in response to a recurring trigger event. However, the server A (105*a*) and server B (105*b*) may re-compute their respective user response measures based on different types of recurring trigger events.

From time to time, a server determines that a newly computed measure of user response indicates that the candidate of the optimal webpage configuration no longer has the highest measure among all of the webpage configurations (161). In one or more embodiments, in response to such determination, another webpage configuration that has higher measure is targeted as a replacement of the candidate. In one or more embodiments, actual replacement of the current candidate requires a synchronization based on measures of user response most recently computed by other servers in the server farm (105). For example, when the server A (105*a*) determines that the measure of user response A (162*a*) indicates a lower measure for the currently selected candidate than another newly identified webpage configuration having a higher measure, the server A (105*a*) computes an aggregate user response measure (164) based on the measure of user response A (162*a*) and the most current version of the measure of user response B (162*b*), as well as other measures of user response most recently computed by other servers in the server farm (105).

In one or more embodiments, the aggregate user response measure is a weighted average of the measure of user response A (162*a*), measure of user response B (162*b*), among other measures of user response. In one or more embodiments, the measure of user response A (162*a*) and the measure of user response B (162*b*) are inversely weighted by the burden rate A (163*a*) and the burden rate B (163*b*), respectively, in the aggregate user response measure (164). In one or more embodiments, the server A (105*a*) proceeds to replace the current candidate by the newly identified webpage configuration if the newly identified webpage configuration also has a higher measure in the aggregate user response measure (164). In one or more embodiments, the server A (105*a*) always replaces the current candidate by the newly identified webpage configuration showing higher measure in the measure of user response A (162*a*), only to revert back to the replaced candidate if the newly identified webpage configuration is later determined to have a lower measure in the aggregate user response measure (164) than the replaced candidate.

In one or more embodiments, an example method used by the server farm (105) for computing the measure of user response and the aggregate user response measure, determining the candidate of the optimal webpage configuration, and detecting the convergence condition to identify the optimal webpage configuration are described in reference to FIG. 2 below. Examples of the webpage configurations (161) and using the method shown in FIG. 2 are described in reference to FIGS. 3.1 through 3.6 below.

Figure 2:
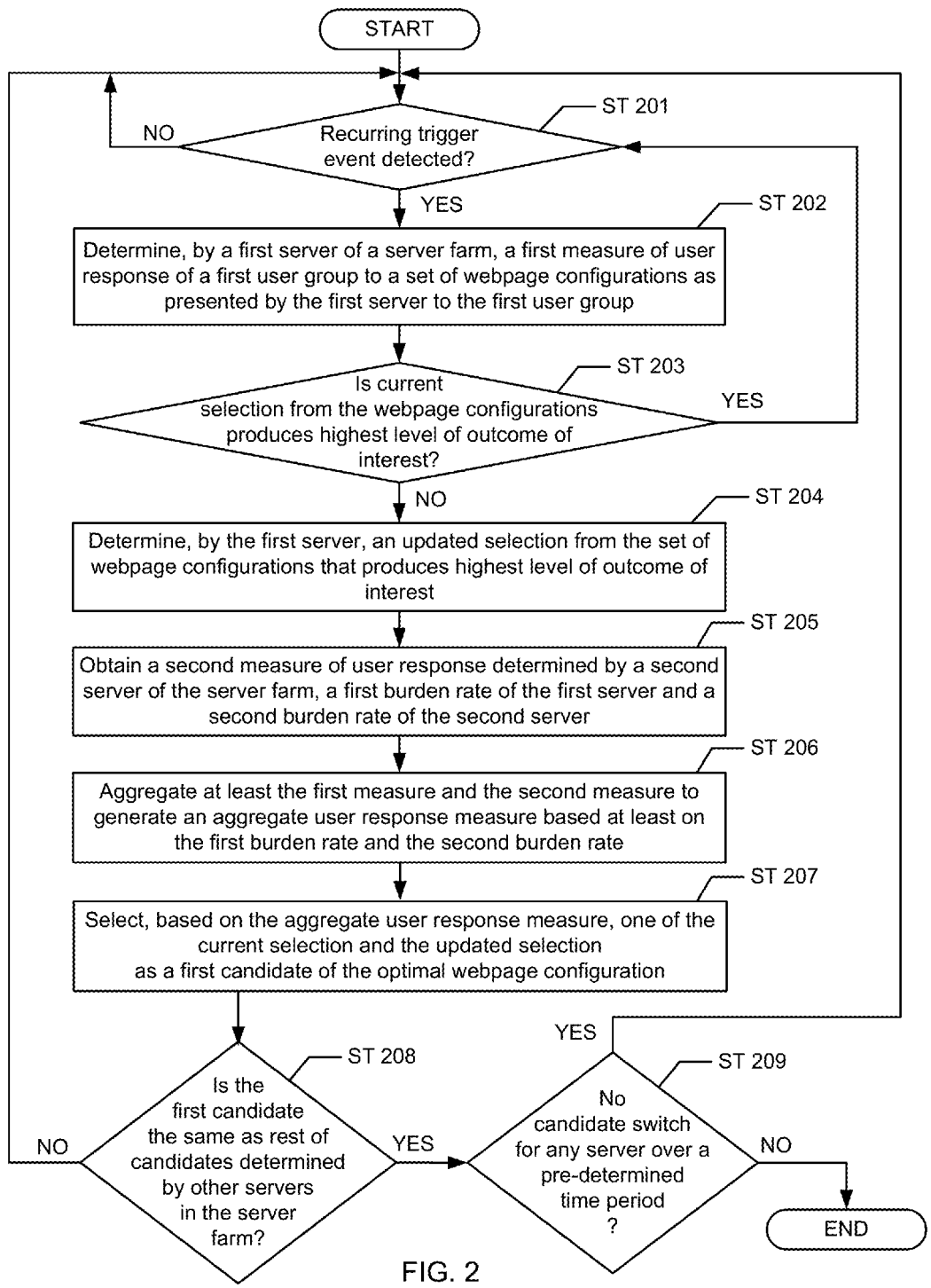
FIG. 2 shows a method flow chart in accordance with one or more embodiments of the invention.

FIG. 2 shows a method flow chart in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In one or more embodiments, the method described below is applied to a server farm having multiple servers hosting one or more websites. In one or more embodiments, users' webpage requests are directed to the server farm via domain name service of the Internet. The server farm is identified by a unique IP (Internet Protocol) address for receiving the webpage requests from the domain name service. The received webpage requests are then distributed to various servers in the server farm for processing. In one or more embodiments, the server farm is configured to perform a testing campaign for selecting an optimal webpage configuration from a test set of webpage configurations. Each server is configured to independently determine, based on user responses observed by each individual server, a selection from the test set as a candidate of the optimal webpage configuration. The candidate of the optimal webpage configuration is also referred to simply as the candidate. The candidate most recently selected by a server before further update is referred to as the current selection of the server. In one or more embodiments, a final selection of the optimal webpage configuration is determined based on individual selections of all participating servers using the method described below.

In Step 201, a recurring trigger event is monitored by a server of the server farm that is referred to as the first server. In one or more embodiments, the recurring trigger event is based on a periodic time schedule, such as every minute, every hour, daily, etc. In one or more embodiments, the recurring trigger event is based on a pre-determined user event. For example, the pre-determined user event may be a user requesting the webpage for the first time. In another example, the pre-determined user event may be any webpage request including the first time request and any subsequent recurring webpage request.

If the recurring trigger event is not detected, the method loops back to Step 201. If the recurring trigger event is detected, the method proceeds to Step 202.

In Step 202, a pre-determined measure of user response, as observed by the first server and referred to as the first measure of user response, is determined in response to the recurring trigger event. The first measure of user response represents the response from a first user group to the test set of webpage configurations as presented by the first server to the user group. In particular, the first user group includes those users whose requests to the webpage are distributed to and processed by the first server. In one or more embodiments, the pre-determined measure of user response is also referred to as the outcome of interest. An example outcome of interest is click-through activity of users in response to viewing the webpage returned by the first server. During the testing campaign, each returned webpage includes a variation defined by a selected webpage configuration that is selected by the first server from the test set. Examples of webpage variations defined by webpage configurations and examples of retuning the webpage based on webpage configuration selected from the test set are described in reference to FIGS. 3.1 through 3.6 below.

In Step 203, a determination is made by the first server based on the first measure of user response. Specifically, the determination pertains to whether the current selection of the first server from the test set produces the highest level of outcome of interest among all webpage configurations in the test set. If the determination is positive, i.e., the first measure of user response indicates that the current selection produces the highest level of outcome of interest, the method returns to Step 201. In other words, no change is made to the current selection and the first server continues to monitor the recurring trigger event to re-evaluate the current selection for the next iteration. If the determination is negative, i.e., the first measure of user response indicates that the current selection no longer produces the highest level of outcome of interest, the method returns to Step 204 to update the current selection.

In Step 204, an updated selection from the test set is determined by the first server. In one or more embodiments, because the current selection no longer produces the highest level of outcome of interest, a different webpage that produces the highest level as indicated by the first measure of user response is selected as the updated selection. This updated selection is targeted to replace the current selection as the candidate of the optimal webpage configuration for the first server.

In Step 205, in response to targeting the updated selection to replace the current selection, the first server obtains global statistics representing user responses and workload of other servers in the server farm. In one or more embodiments, the global statistics are directly retrieved from a database or indirectly derived from the retrieved data. In one or more embodiments, the database is located on a central data repository shared by all servers in the server farm.

In one or more embodiments, the global statistics include measures of user response and workload that are determined and submitted to the database by each server in the server farm at most recent synchronization event of each individual server. Using a simplified server farm example of only two servers, the first server retrieved the measure of user response and workload determined and submitted to the database by a second server of the server farm. The first server may compute a burden rate of each server based on the workload of the first server and the workload of the second server. In one or more embodiments, the first burden rate represents the relative contribution of the first server to a total workload performed by the server farm, and the second burden rate represents the relative contribution of the second server to the total workload performed by the server farm.

In Step 206, the first measure of user response and at least the second measure of user response are aggregated by the first server to generate an aggregate user response measure. Specifically, the measures of user response observed by all servers in the server farm and retrieved from the database by the first server are included in the aggregate user response measure. In one or more embodiments, the first measure of user response and the second measure of user response are inversely weighted by the first burden rate and the second burden rate, respectively, in the aggregate user response measure. An example of aggregating all measures of user responses based on burden rate of each server is described in reference to FIGS. 3.1 through 3.6 below.

In Step 207, based on the aggregate user response measure, one of the current selection and the updated selection is selected by the first server as the candidate of the optimal webpage configuration for the first server, referred to as the first candidate. In one or more embodiments, the user requested webpage is returned to majority of the first user group by the first server based on the first candidate.

In Steps 208 and 209 below, a convergence condition of the optimal webpage configuration is detected based on an equivalence of the first candidate and all other candidates of other servers over a pre-determined time period. Specifically, in Step 208, a determination is made as to whether the first candidate is the same as the rest of candidates determined by other servers. If the determination is negative, i.e., at least one candidate is different than other candidates, the method returns to Step 201 for another iteration through the flow chart. If the determination is positive, i.e., all candidates are the same across the server farm, the method proceeds to Step 209 to detect any thrashing condition.

Specifically, in Step 209, another determination is made as to whether any candidate switch has occurred during a pre-determined time period up to the point of this determination. If the determination is negative, i.e., at least one candidate is switched by a server during this time period, the method returns to Step 201 for another iteration through the flow chart. If the determination is positive, i.e., all candidates are the same across the server farm for the entire pre-determined time period up to the point of this determination, the method ends and the final remaining candidate that is the same across all servers is determined as the optimal webpage configuration. Accordingly, the testing campaign is completed. In one or more embodiments, throughout the testing campaign each server iteratively selects its candidate of optimal webpage configuration and returns the requested webpage to the majority of users served by each individual server based on this candidate.

FIGS. 3.1, 3.2, 3.3, 3.4, 3.5, and 3.6 show an example in accordance with one or more embodiments of the invention. In one or more embodiments, the example shown in FIGS. 3.1, 3.2, 3.3, 3.4, 3.5, and 3.6 may be based on the system (100) shown in FIG. 1 and the method flow chart shown in FIG. 2 above. In the example shown in FIGS. 3.1, 3.2, 3.3, 3.4, 3.5, and 3.6, the webpage configuration may be referred to as a "recipe", the webpage configuration that is selected to present to a user may be referred to as an "offer", the candidate of optimal webpage configuration that is shown to a large user population may be referred to as the "best offer", and the measure of user response may be referred to as a "value".

FIGS. 3.1 and 3.2 show screenshot A (310) and screenshot B (320) of two webpage configurations as an example of the webpage configurations (161) shown in FIG. 1 above. This example is referred to as a simple campaign to optimize the webpage placement of a button (311) that activates user feedback. As shown in FIG. 3.1, the screenshot A (310) is based on a first simple campaign webpage configuration where the button A (311a) to collect user feedback is located at a bottom right location of the webpage. In contrast in FIG. 3.2, the screenshot B (320) is based on a second simple campaign webpage configuration where the button B (311b) to collect user feedback is located at a middle left location of the webpage. In one or more embodiments, the two simple campaign webpage configurations are implemented using the same HTML (Hyper Text Markup Language) code that includes both the button A (311a) and button B (311b) (collectively referred to as the feedback button) where visibility of each feedback button is controlled by a HTML<div> tag inserted in the HTML code. Specifically, the HTML<div> tag for each feedback button is set by a control program executing on the server to select which of the two simple campaign webpage configurations is used to return the requested webpage.

As an example, for ten percent of the first time requests, such as the first time request (102n) shown in FIG. 1, the server returns the user requested webpage based on a webpage configuration randomly selected from these two simple campaign webpage configurations. For the other ninety percent of the first time requests, the server returns a particular webpage configuration that has previously been selected as the candidate of optimal webpage configuration. For any recurring request, such as request X (102x), request Y (102y), request Z (102z), request W (102w) shown in FIG. 1, the user receives the same webpage configuration consistent with the returned webpage from the user's first time request. The server then accumulates user responses from subsequent user actions resulting from all these first time requests and recurring requests.

In an example implementation, the candidate of optimal webpage configuration is re-evaluated for each request among the ninety percent of the first time requests. This approach differs from a classic A/B test where each variant (A or B) is returned to fifty percent or more of the user population, requiring a human analyst to analyze the results of the test to manually pick the winner. By periodically re-evaluating the candidate of optimal webpage configuration, the winning webpage configuration is returned to users from the very beginning of the campaign to as many users as possible (e.g., ninety percent of the population, such as the non-experimental user group A (101b), non-experimental user group B (101d)).

For the simple campaign example shown in FIGS. 3.1 and 3.2, the user may choose to click on the feedback button or choose to ignore it when presented with the particular webpage configuration. If a user clicks on the feedback button, the HTML code on the webpage sends a JavaScript command to record a success event, and update the total count of successes for the corresponding simple campaign webpage configuration. For example, the total count of successes may be used to determine the measure of user response A (162a) or the measure of user response B (162b) shown in FIG. 1 above.

In one or more embodiments, the measure of user response represents a particular outcome of interest referred to as click-through activity. Based on the system (100) of FIG. 1, the measure of user response A (162a)=(total number of successes across the server farm (105) for the particular webpage configuration+total number of successes recorded by the server A (105a) for the particular webpage configuration) divided by (total number of times the particular webpage configuration was returned to users by all servers in the server farm (105)+total number of times the particular webpage configuration was returned to users by the server A (105a)). In one or more embodiments, the total number of successes recorded by the server A (105a) for the particular webpage configuration is adjusted (or weighted) by a success multiplier that is based on the burden rate A (163a), and the total number of times the particular webpage configuration was returned to users by the server A (105a) is adjusted by a value multiplier that is also based on the burden rate A (163a). These two adjustments are important to ensure the convergence condition of the candidate of optimal webpage configuration across all servers in the server farm (105). In other words, these two adjustments eliminate or suppress (i.e., reduce the elapse time) the thrashing condition where multiple candidates of optimal webpage configuration among different servers compete to be the one generating the highest click-through activity. These two adjustments differ from the Epsilon-Greedy algorithm that picks the winner based on simple click-through-logic.

An example pseudo code module to determine the candidate of optimal webpage configuration is shown in TABLE 1 below. Within this example pseudo code module, as noted above, the webpage configuration is referred to as a "recipe", the webpage configuration that is selected to present to a user is referred to as an "offer", the candidate of optimal webpage configuration that is shown to a large user population is referred to as the "best offer", and the measure of user response is referred to as a "value".

TABLE 1

```
publicstaticRecipe DetermineBestOffer(Campaigncmpn, Statstat,
stringMachineName)
    {
Recipe offer = null;
//loop thru recipes and pick the best
var recipes = (from r instat.recipe
wherer.CmpnId == cmpn.CmpnId
select r).ToArray( );
if (recipes != null)
    {
foreach (Recipe r in recipes)
    {
if (offer == null)
    {
//initialize
offer = r;
    }
else
    {
//pick winner
//calculate the expectation of award for each recipe and compare the values
doublethisOffer = 0;
doublethisRecipe = 0;
doublethisValueFactor = RecipeValueFactor(stat, r, MachineName);
doublethisSuccessFactor = RecipeSuccessFactor(stat, r, MachineName);
if (r.RecipeValue> 0 || r.TotalValue> 0)
    {
thisRecipe =
            (Convert.ToDouble(r.TotalSuccess) +
(Convert.ToDouble(r.RecipeSuccess) * thisSuccessFactor)) /
            (Convert.ToDouble(r.TotalValue) +
(Convert.ToDouble(r.RecipeValue) * thisValueFactor));
    }
doublethisOfferValueFactor = RecipeValueFactor(stat, offer,
MachineName);
doublethisOfferSuccessFactor = RecipeSuccessFactor(stat, offer,
MachineName);
if (offer.RecipeValue> 0 || offer.TotalValue> 0)
    {
thisOffer =
            (Convert.ToDouble(offer.TotalSuccess) +
(Convert.ToDouble(offer.RecipeSuccess) * thisOfferSuccessFactor)) /
            (Convert.ToDouble(offer.TotalValue) +
(Convert.ToDouble(offer.RecipeValue) * thisOfferValueFactor));
    }
if (thisRecipe>thisOffer)
    {
offer = r;
    }
```

TABLE 1-continued

```
      }
     }
    }
return offer;
   }
```

As shown in TABLE 1, the DetermineBestOffer method loops through all of the recipes within the campaign to determine the best offer by comparing each recipe to each other in the campaign and selecting the best offer that has the highest value by dividing the TotalSuccess times its burden rate of successes or Recipe Success Factor by the TotalValues times its burden rate of values or Recipe Value Factor of each recipe in the campaign.

Based on the example pseudo code module shown in TABLE 1, the counts from all the servers and the counts by each server are used to determine the best offer. The counts are synchronized across the server farm hourly. The counts are uploaded and downloaded from the database during synchronization. Each server uploads its counts and downloads the total counts from the database, independently of each other. Each server uses this collective data to derive the burden rates of itself and other servers. If a server is taken out of service during this process, the burden rates are adjusted accordingly. Without the two adjustments based on the burden rates, finalizing the convergence condition of the campaign may take several weeks or longer, or not at all. An example pseudo code module to perform the burden rate based adjustments is shown in TABLE 2 below. Within this example pseudo code module, the server farm is referred to as a "farm", and each server is referred to as a "machine".

TABLE 2

```
//<summary>
/// Calculate the factor to adjust the current Recipe Values
///</summary>
///<param name="stat"></param>
///<param name="r"></param>
///<returns></returns>
publicstaticdoubleRecipeValueFactor(Stat stat, Recipe r,
stringMachineName)
   {
doublethisRecipeValueMultiplier = 0.0;
doublethisTotalFarmValue = 0.0;
doublethisTotalMachineValue = 0.0;
doublethisMultiplier = 0.0;
doublethisWeight = 0.0;
doublethisActiveMachinesInFarm = 0.0;
doublethisTotalMachines = 0.0;
doublethisBurden = 0.0;
try
   {
//get total recipe values of all recipes in all machines across the entire
farm
varthisFarmValue = (from m instat.farm
selectm.RecipeValue);
if (thisFarmValue != null)
thisTotalFarmValue = thisFarmValue.Sum( );
//get total recipe values of all the recipes in this machine only
varthisMachineValue = (fromrvinstat.farm
where (rv.MachineId == MachineName)
selectrv.RecipeValue);
if (thisMachineValue != null)
thisTotalMachineValue = thisMachineValue.Sum( );
//compute the weighted average of this machine divided by the total farm
if (thisTotalFarmValue> 0)
thisWeight = thisTotalMachineValue / thisTotalFarmValue;
//compute the multiplier which is the inverse of the weighted average
if (thisWeight> 0)
thisMultiplier = 1.0 / thisWeight;
//now calculate how many active machines have values by recipe
```

TABLE 2-continued

```
varthisActiveMachines = (from am instat.farm
where (am.RecipeValue> 0 &&am.RecipeId == r.RecipeId)
selectam.MachineId.Distinct( ));
if (thisActiveMachines != null)
thisActiveMachinesInFarm = thisActiveMachines.Count( );
//and calculate the total machines in the farm by recipe
varthisNumberMachines = (from nm instat.farm
where (nm.MachineId != null&&nm.RecipeId == r.RecipeId)
selectnm.MachineId.Distinct( ));
if (thisNumberMachines != null)
thisTotalMachines = thisNumberMachines.Count( );
//calculate the burden of this machine
if (thisTotalMachines> 0)
thisBurden = thisActiveMachinesInFarm / thisTotalMachines;
//calculate the adjusted multiplier
thisRecipeValueMultiplier = thisBurden * thisMultiplier;
if (thisRecipeValueMultiplier< 1) thisRecipeValueMultiplier = 1;
   }
catch (Exception ex)
   {
WebLogger.Error("300", "EpsilonGreedyRecipeValueMultiplier failed.
Reason: " + ex.ToString( ));
   }
returnthisRecipeValueMultiplier;
   }
```

In summary, the total recipe values of all the recipes in all machines in the farm are aggregated as "thisFarmValue", and the total recipe values of all the recipes in this machine only are aggregated as "thisMachineValue". The ratio of "thisFarmValue" over "thisMachineValue" (i.e., thisFarmValue divided by thisMachineValue) is referred to as the weighted average of this machine, which represents the responsiveness of this machine compared to other machines in the farm to return offers. The weighted average of this machine divided by the total farm is computed as the "thisTotalFarmValue", and the Multiplier is then computed as "thisMultiplier" based on these parameters as the inverse of the weighted average "thisTotalFarmValue". In addition, the number of active machines having values by recipes in the farm is tallied as "thisActiveMachinesInFarm" and the total machines in the farm by recipes are tallied as "thisTotalMachines". Using these numbers, the burden of this machine is calculated as "thisBurden" by dividing the "thisActiveMachinesInFarm" over the "thisTotalMachines". "ThisBurden" is then multiplied by "thisMultiplier" to derive "thisRecipeValueMultiplier." If thisRecipeValueMultiplier is less than 1, then it is adjusted to represent the actual value that was counted as 1. Otherwise, thisRecipeValueMultiplier is used to adjust the value factor. The value factor is the number that is returned by the method called RecipeValueFactor in TABLE 2. The value factor is thisRecipeValueMultiplier that is set by the method in the computer instructions in TABLE 2. If this thisRecipeValueMultiplier=1, then the value factor that is returned is 1. Otherwise the value factor is thisBurden multiplied times thisMultiplier.

In one or more embodiments, consistent with the computation described above, if a server has been processing more data than the other servers, its multiplier is adjusted lower (e.g., less than the other servers in the farm) to compensate for the imbalance, thereby, producing a more accurate representation of which recipe is resulting in highest level of click-through activity. The adjusted multiplier is applied to the local statistics gathered that aren't yet recorded to the database to estimate the other servers' activities. For example, two servers have recorded the following statistics:

Server A: 40 impressions
Server B: 20 impressions

Each server calculates a multiplier to adjust the workload to the farm total, which is 60 impressions. So Server A, the busier server, calculates a multiplier of 1.5 (60/40), whereas Server B calculates a multiplier of 3 (60/20).

As a parallel example to the simple campaign, the converse campaign is the opposite of the simple campaign in that the winning recipe is based on the lowest level of outcome of interest.

FIGS. 3.3, 3.4, and 3.5 show screenshot C (330), screenshot D (340) and screenshot E (350) of three webpage configurations as another example of the webpage configurations (161) shown in FIG. 1 above. This example is referred to as a dichotomy campaign to optimize the text prompt inviting the user to provide feedback by taking a survey. The user may accept by activating a button A (301) to take the survey, or decline by activating a button B (302). The button A (301) and button B (302) are collectively referred to as the survey buttons. As shown in FIG. 3.3, the screenshot C (330) is based on a first dichotomy campaign webpage configuration where the text prompt A (304) reads "Thanks for visiting us today. We value your input." Alternatively in FIG. 3.4, the screenshot D (340) is based on a second dichotomy campaign webpage configuration where the text prompt B (305) reads "Great to see you. Tell us how we do." Further, in FIG. 3.5, the screenshot E (350) is based on a third dichotomy campaign webpage configuration where the text prompt C (306) reads "Hey there! Wanna make our day?"

Although the survey buttons are the same in each recipe, the text prompt to encourage the user to take the survey is different in each recipe. How the text prompt is worded can have a significant impact on how many users take the survey. The winning recipe is selected automatically by comparing how many times users select a positive response (the "Sure" button or button B (302)) versus a negative response (the "No Thanks" button or button A (301)) across the farm using the burden rate calculations The counts of the positive and negative responses are stored in the cache memory on each server, and synchronized across the farm, periodically (e.g., hourly). In this manner, each server works independently of the others to determine the winning recipe. Once the winning recipe has been "finalized", it is shown to all of users that visit the website.

FIG. 3.6 shows an example bar chart (360) illustrating how individual servers within a farm determine individual winning recipes while being mostly disconnected from each other. This is predominantly for performance reason, so that executing a test campaign in a server farm does not introduce performance issues from keeping the individual servers continuously synchronized or relying on a single server to provide the single point of observation. However, to ensure that all individual winning recipes converge over time, each server does occasionally synchronize via the database.

During each synchronization, the server first writes the results of the testing campaign (e.g., the outcome of interest) to the database. This increments various counters maintained in the database by the raw counts of user clicks accumulated since the last synchronization. The server then reads the database to obtain the updated counter readings of all other servers in the farm. Based on these updates, the server then determines whether to keep the current winning recipe or replace it with an updated winning recipe.

In one or more embodiments, five types of events may trigger synchronization:

(i) Load. Because servers can be restarted, a synchronization is performed to start with any data already accumulated when the campaign is first loaded.

(ii) Switching. When any server switches to a new winning recipe, it performs synchronization and writes details of the switch to the database.

(iii) Periodic time schedule. The servers may synchronize on a configurable frequency to ensure that individual servers do not drift too far from the overall campaign results and that the burden rate is periodically recalculated.

(iv) Shutdown. If the server is shutdown or restarted, such as for maintenance, it will synchronize as part of the shutdown process.

(v) Finalization. If a server observes that the campaign has not switched for a pre-determined period (e.g., 5 days, a week, etc.), it will perform one final synchronization to finalize the campaign. This is partly to include its results in the final campaign, but also to protect against the unlikely scenario that another server switched in the final instant of campaign testing. If the synchronization causes the server to detect that a switch has occurred, it will not perform the finalization and restart the pre-determined period for confirming no more switch will occur from any server.

Other than when these synchronization events occur, the statistics accumulated by each server are kept in server local memory separate from the database. As a result, between synchronizations, the testing campaign results on each server are a combination of the click-through statistics already stored in the database at the last synchronization plus the additional in-memory statistics accumulated by the server. Because the most recent click-through statistics from other servers are not available until the next synchronization, the current in-memory statistics are adjusted for comparing outcome of interest among different recipes.

The adjustment is to include an estimate of the recent click-through statistics observed by other servers in the farm. During the synchronization, if the server sees that it accounted for 20% of the overall counts for a specific statistic, the server calculates an adjustment factor of five so that every count of that statistic on that server is assumed to be worth five counts in determining the current winner and whether to generate a switch. The minimum adjustment factor is one. When writing the results back to the database during the next synchronization, unadjusted figures are written without accounting for activity performed by other servers.

Because the synchronizations are occasional and always via the database, it may take some time for the other servers to see the switch. The example bar chart (360) shown in FIG. 3.6 is a hypothetical timeline involving two recipes A and B, and a server farm of two servers 1 and 2. Specifically, the bar chart (360) shows a top bar where the recipe A is selected by the server 1 as the winning recipe (i.e., candidate of optimal webpage configuration for server 1) from time point A (321) to time point C (323) between the two periodic time schedule triggered synchronizations. The bar chart (360) also shows a bottom bar where the recipe A is selected by the server 2 as the winning recipe (i.e., candidate of optimal webpage configuration for server 2) from the periodically scheduled synchronization at time point A (321) to time point B (322) when the click-through activity observed by the server 2 causes the winning recipe A to be replaced by recipe B. As noted above, the server 2 performs an extra synchronization triggered by this switching event. Although both servers 1 and 2 perform the two periodically scheduled synchronizations at time point A (321) and time point B (322), the exact time when the synchronization is initiated and completed may differ for the two servers. Further as shown in FIG. 3.6, the winning recipes on both servers are the same recipe B after the time point C (323). If no thrashing condition occurs over a pre-determined time period (e.g., 7 days), the convergence condition is satisfied and recipe B is selected as the optimal webpage configuration across the server farm of servers 1 and 2.

Figure 4:
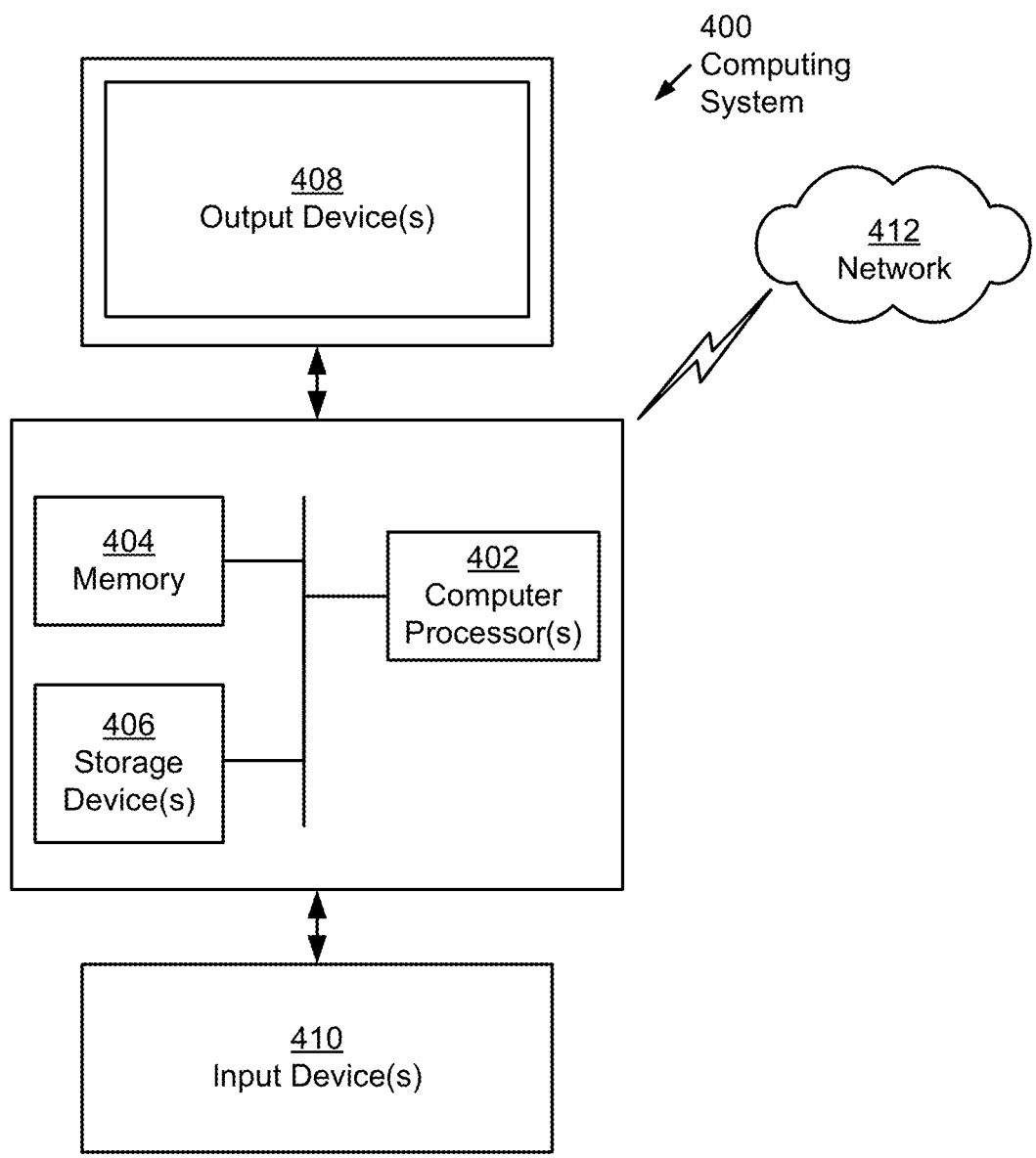
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to select an optimal webpage configuration for a server farm, comprising:
   determining, by a first server of the server farm and in response to a recurring trigger event, a first measure of user response of a first user group to a plurality of webpage configurations as presented by the first server to the first user group;
   determining a current selection of the plurality of webpage configurations, wherein the current selection is a first candidate of the optimal webpage configuration prior to the pre-determined trigger event;
   determining, by the first server and in response to determining the first measure of user response, an updated selection from the plurality of webpage configurations, wherein the updated selection is determined based on the first measure of user response, and wherein the updated selection is determined as a target to replace the current selection as the first candidate of the optimal webpage configuration;
   obtaining, by the first server and in response to targeting the updated selection to replace the current selection, a second measure of user response, a first burden rate of the first server and a second burden rate of the second server,
      wherein the second measure of user response is determined by a second server of the server farm,
      wherein the second measure of user response represents a response of a second user group to the plurality of webpage configurations as presented by the second server to the second user group,
      wherein the first burden rate represents first relative contribution of the first server to a total workload performed by the server farm, and
      wherein the second burden rate represents second relative contribution of the second server to the total workload performed by the server farm;
   aggregating, by the first server, the first measure of user response and at least the second measure of user response to generate an aggregate user response measure, wherein the first measure of user response and the second measure of user response are inversely weighted by the first burden rate and the second burden rate, respectively, in the aggregate user response measure; and
   selecting, by the first server and based on the aggregate user response measure, one of the current selection and the updated selection as the first candidate of the optimal webpage configuration subsequent to the pre-determined trigger event.

2. The method of claim 1,
   wherein the recurring trigger event comprises at least one selected from a group consisting of a pre-determined time interval and a webpage request from a new user separate from the first user group.

3. The method of claim 1, further comprising:
iteratively updating, by the first server, the first candidate of the optimal webpage configuration in response to a first plurality of recurring trigger events,
wherein the first plurality of recurring trigger events comprises the recurring trigger event, and
wherein iteratively updating the first candidate comprises selecting the one of the current selection and the updated selection as the first candidate subsequent to the pre-determined trigger event;
iteratively updating, by the second server, a second candidate of the optimal webpage configuration in response to a second plurality of recurring trigger events, wherein iteratively updating the second candidate comprises:
obtaining, by the second server, the first measure of user response; and
selecting, subsequent to the recurring trigger event and in response to at least a first one of the second plurality of recurring trigger events, the second candidate from the plurality of webpage configurations based at least on the first measure of user response; and
determining a convergence condition of the optimal webpage configuration by detecting an equivalence of the first candidate and the second candidate over a pre-determined time period, wherein the first candidate and the second candidate have not been replaced based on the iteratively updating during the pre-determined time period.

4. The method of claim 3, further comprising:
storing, by the second server prior to the recurring trigger event and in response to a second one of the second plurality of recurring trigger events, the second measure of user response in a central data repository of the server farm,
wherein the second measure of user response and the second burden rate of the second server are obtained by the first server from the central data repository.

5. The method of claim 3, further comprising:
presenting, by the first server and concurrently with iteratively updating the first candidate of the optimal webpage configuration, the first candidate to a first portion of the first user group; and
presenting, by the second server and concurrently with iteratively updating the second candidate of the optimal webpage configuration, the second candidate to a second portion of the second user group.

6. The method of claim 1,
wherein each of the plurality of webpage configurations comprises a web link,
wherein the first measure of user response is proportional to a first tally of the first user group clicking the web link, and
wherein the second measure of user response is proportional to a second tally of the second user group clicking the web link.

7. The method of claim 1,
wherein each of the plurality of webpage configurations comprises a web link,
wherein the first measure of user response is inversely proportional to a first tally of the first user group clicking the web link, and
wherein the second measure of user response is inversely proportional to a second tally of the second user group clicking the web link.

8. The method of claim 1,
wherein each of the plurality of webpage configurations comprises a first web link and a second web link,
wherein the first measure of user response is proportional to a first tally of the first user group clicking the first web link and inversely proportional to a second tally of the first user group clicking the second web link, and
wherein the second measure of user response is proportional to a third tally of the second user group clicking the first web link and inversely proportional to a fourth tally of the second user group clicking the second web link.

9. A system for selecting an optimal webpage configuration for a server farm, comprising:
a first server of the server farm configured to determine, in response to a recurring trigger event, a first measure of user response of a first user group to a plurality of webpage configurations as presented by the first server to the first user group; and
a second server configured to determine a second measure of user response,
wherein the first server is further configured to:
determine a current selection of the plurality of webpage configurations, wherein the current selection is a first candidate of the optimal webpage configuration prior to the pre-determined trigger event,
determine, in response to determining the first measure of user response, an updated selection from the plurality of webpage configurations,
wherein the updated selection is determined based on the first measure of user response, and
wherein the updated selection is determined as a target to replace the current selection as the first candidate of the optimal webpage configuration,
obtain, in response to targeting the updated selection to replace the current selection, the second measure of user response, a first burden rate of the first server and a second burden rate of the second server,
wherein the second measure of user response is determined by a second server of the server farm,
wherein the second measure of user response represents a response of a second user group to the plurality of webpage configurations as presented by the second server to the second user group,
wherein the first burden rate represents first relative contribution of the first server to a total workload performed by the server farm, and
wherein the second burden rate represents second relative contribution of the second server to the total workload performed by the server farm,
aggregate the first measure of user response and at least the second measure of user response to generate an aggregate user response measure, wherein the first measure of user response and the second measure of user response are inversely weighted by the first burden rate and the second burden rate, respectively, in the aggregate user response measure, and
select, based on the aggregate user response measure, one of the current selection and the updated selection as the first candidate of the optimal webpage configuration subsequent to the pre-determined trigger event.

10. The system of claim 9,
wherein the recurring trigger event comprises at least one selected from a group consisting of a pre-determined time interval and a webpage request from a new user separate from the first user group.

11. The system of claim 9,
wherein the first server is further configured to:
  iteratively update the first candidate of the optimal webpage configuration in response to a first plurality of recurring trigger events,
  wherein the first plurality of recurring trigger events comprises the recurring trigger event, and
  wherein iteratively updating the first candidate comprises selecting the one of the current selection and the updated selection as the first candidate subsequent to the pre-determined trigger event,
wherein the second server is further configured to:
  iteratively update a second candidate of the optimal webpage configuration in response to a second plurality of recurring trigger events,
  wherein iteratively updating the second candidate comprises:
    obtaining the first measure of user response; and
    selecting, subsequent to the recurring trigger event and in response to at least a first one of the second plurality of recurring trigger events, the second candidate from the plurality of webpage configurations based at least on the first measure of user response, and
wherein the first server and the second server are further configured to:
  determine a convergence condition of the optimal webpage configuration by detecting an equivalence of the first candidate and the second candidate over a pre-determined time period,
  wherein the first candidate and the second candidate have not been replaced based on iteratively updating during the pre-determined time period.

12. The system of claim 11, wherein the second server is further configured to:
  store, prior to the recurring trigger event and in response to a second one of the second plurality of recurring trigger events, the second measure of user response in a central data repository of the server farm,
  wherein the second measure of user response and the second burden rate of the second server are obtained by the first server from the central data repository.

13. The system of claim 11,
wherein the first server is further configured to present, concurrently with iteratively updating the first candidate of the optimal webpage configuration, the first candidate to a first portion of the first user group, and
wherein the second server is further configured to present, concurrently with iteratively updating the second candidate of the optimal webpage configuration, the second candidate to a second portion of the second user group.

14. The system of claim 9,
wherein each of the plurality of webpage configurations comprises a web link,
wherein the first measure of user response is proportional to a first tally of the first user group clicking the web link, and
wherein the second measure of user response is proportional to a second tally of the second user group clicking the web link.

15. The system of claim 9,
wherein each of the plurality of webpage configurations comprises a web link,
wherein the first measure of user response is inversely proportional to a first tally of the first user group clicking the web link, and
wherein the second measure of user response is inversely proportional to a second tally of the second user group clicking the web link.

16. The system of claim 9,
wherein each of the plurality of webpage configurations comprises a first web link and a second web link,
wherein the first measure of user response is proportional to a first tally of the first user group clicking the first web link and inversely proportional to a second tally of the first user group clicking the second web link, and
wherein the second measure of user response is proportional to a third tally of the second user group clicking the first web link and inversely proportional to a fourth tally of the second user group clicking the second web link.

17. A non-transitory computer readable medium storing instructions to select an optimal webpage configuration for a server farm, the instructions, when executed by a computer processor, comprising functionality for:
  determining, by a first server of the server farm and in response to a recurring trigger event, a first measure of user response of a first user group to a plurality of webpage configurations as presented by the first server to the first user group;
  determining a current selection of the plurality of webpage configurations, wherein the current selection is a first candidate of the optimal webpage configuration prior to the pre-determined trigger event;
  determining, by the first server and in response to determining the first measure of user response, an updated selection from the plurality of webpage configurations, wherein the updated selection is determined based on the first measure of user response, and
  wherein the updated selection is determined as a target to replace the current selection as the first candidate of the optimal webpage configuration;
  obtaining, by the first server and in response to targeting the updated selection to replace the current selection, a second measure of user response, a first burden rate of the first server and a second burden rate of the second server,
    wherein the second measure of user response is determined by a second server of the server farm,
    wherein the second measure of user response represents a response of a second user group to the plurality of webpage configurations as presented by the second server to the second user group,
    wherein the first burden rate represents first relative contribution of the first server to a total workload performed by the server farm, and
    wherein the second burden rate represents second relative contribution of the second server to the total workload performed by the server farm;
  aggregating, by the first server, the first measure of user response and at least the second measure of user response to generate an aggregate user response measure, wherein the first measure of user response and the second measure of user response are inversely weighted by the first burden rate and the second burden rate, respectively, in the aggregate user response measure; and
  selecting, by the first server and based on the aggregate user response measure, one of the current selection and the updated selection as the first candidate of the optimal webpage configuration subsequent to the pre-determined trigger event.

18. The non-transitory computer readable medium of claim 17,
wherein the recurring trigger event comprises at least one selected from a group consisting of a pre-determined time interval and a webpage request from a new user separate from the first user group.

19. The non-transitory computer readable medium of claim 17,
wherein the first server is further configured to:
iteratively update the first candidate of the optimal webpage configuration in response to a first plurality of recurring trigger events,
wherein the first plurality of recurring trigger events comprises the recurring trigger event, and
wherein iteratively updating the first candidate comprises selecting the one of the current selection and the updated selection as the first candidate subsequent to the pre-determined trigger event,
wherein the second server is further configured to:
iteratively update a second candidate of the optimal webpage configuration in response to a second plurality of recurring trigger events,
wherein iteratively updating the second candidate comprises:
obtaining the first measure of user response; and
selecting, subsequent to the recurring trigger event and in response to at least a first one of the second plurality of recurring trigger events, the second candidate from the plurality of webpage configurations based at least on the first measure of user response, and
wherein the first server and the second server are further configured to:
determine a convergence condition of the optimal webpage configuration by detecting an equivalence of the first candidate and the second candidate over a pre-determined time period,
wherein the first candidate and the second candidate have not been replaced based on iteratively updating during the pre-determined time period.

20. The non-transitory computer readable medium of claim 19, wherein the second server is further configured to:
store, prior to the recurring trigger event and in response to a second one of the second plurality of recurring trigger events, the second measure of user response in a central data repository of the server farm,
wherein the second measure of user response and the second burden rate of the second server are obtained by the first server from the central data repository.

21. The non-transitory computer readable medium of claim 19,
wherein the first server is further configured to present, concurrently with iteratively updating the first candidate of the optimal webpage configuration, the first candidate to a first portion of the first user group, and
wherein the second server is further configured to present, concurrently with iteratively updating the second candidate of the optimal webpage configuration, the second candidate to a second portion of the second user group.

22. The non-transitory computer readable medium of claim 17,
wherein each of the plurality of webpage configurations comprises a web link,
wherein the first measure of user response is proportional to a first tally of the first user group clicking the web link, and
wherein the second measure of user response is proportional to a second tally of the second user group clicking the web link.

23. The non-transitory computer readable medium of claim 17,
wherein each of the plurality of webpage configurations comprises a web link,
wherein the first measure of user response is inversely proportional to a first tally of the first user group clicking the web link, and
wherein the second measure of user response is inversely proportional to a second tally of the second user group clicking the web link.

24. The non-transitory computer readable medium of claim 17,
wherein each of the plurality of webpage configurations comprises a first web link and a second web link,
wherein the first measure of user response is proportional to a first tally of the first user group clicking the first web link and inversely proportional to a second tally of the first user group clicking the second web link, and
wherein the second measure of user response is proportional to a third tally of the second user group clicking the first web link and inversely proportional to a fourth tally of the second user group clicking the second web link.

* * * * *